No. 668,485.  
Patented Feb. 19, 1901.
I. BRIGGS.
CULINARY PRESS.
(Application filed Aug. 17, 1900.)
(No Model.)
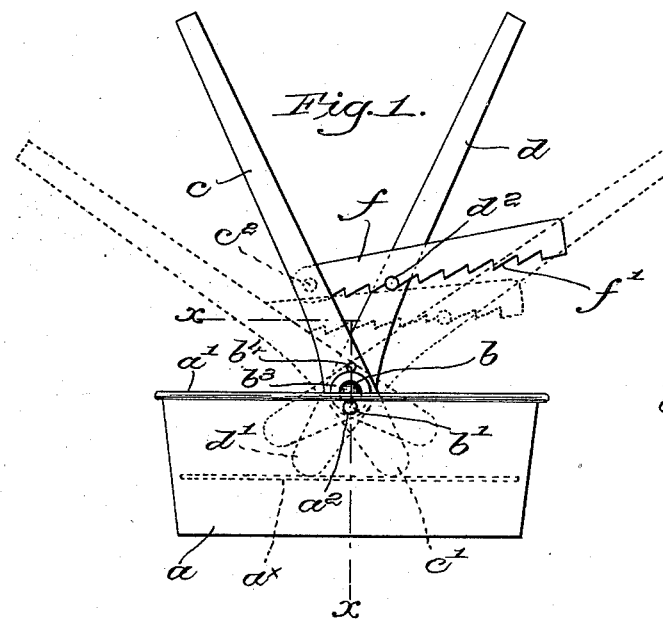
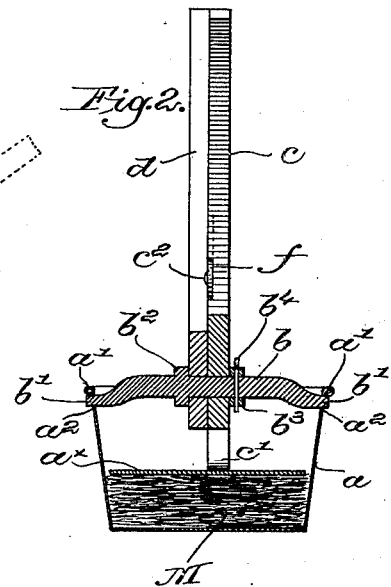
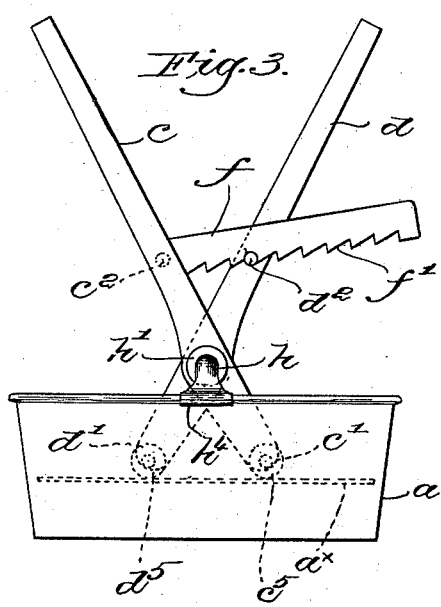
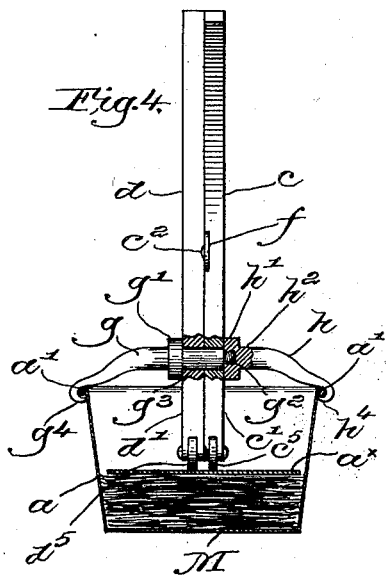
Witnesses.  
Thomas K. Drummond  
Adolf C. Kaiser
Inventor.  
Isaac Briggs.  
By Brosley Gregory,  
Attys.

UNITED STATES PATENT OFFICE.

ISAAC BRIGGS, OF MIDDLEBORO, MASSACHUSETTS, ASSIGNOR OF ONE-HALF TO CHARLES W. S. McNALLY, OF SOMERVILLE, MASSACHUSETTS.

CULINARY PRESS.

SPECIFICATION forming part of Letters Patent No. 668,485, dated February 19, 1901.

Application filed August 17, 1900. Serial No. 27,124. (No model.)

*To all whom it may concern:*

Be it known that I, ISAAC BRIGGS, a citizen of the United States, and a resident of Middleboro, in the county of Plymouth and State of Massachusetts, have invented an Improvement in Culinary Presses, of which the following description, in connection with the accompanying drawings, is a specification, like letters on the drawings representing like parts.

My invention has for its object the production of a cheap, simple, and convenient culinary press for pressing or molding corn-beef, head-cheese, vegetables, &c., so constructed that all the parts can be readily assembled or taken apart and rapid and efficient in operation.

Figure 1 is a side elevation of a culinary press embodying my invention, the compressing means being shown in two positions. Fig. 2 is a transverse section thereof on the irregular line $x\ x$, Fig. 1. Fig. 3 is a side elevation of the press, showing a modified form of support for the compressing means; and Fig. 4 is an end elevation thereof.

The culinary press as herein shown comprises a pan or receptacle $a$ of suitable shape and depth to hold the material to be pressed, the side walls having each a longitudinal strengthening head or rib $a'$ at the top.

The follower $a^\times$, corresponding to the shape of the pan, is adapted to be readily inserted therein to rest upon the top of the contents M, Fig. 2, of the receptacle.

In Figs. 1 and 2 I have shown a cross-bar $b$ as detachably connected with the pan, the ends $b'$ of the bar being reduced to enter holes $a^2$ in the side walls of the pan, the walls being spread or sprung slightly to admit the insertion of the bar. The latter is shown in Fig. 2 as having an annular flange or shoulder $b^2$ near its center and also a removable collar $b^3$ held in place in suitable manner, as by a pin $b^4$. Between the shoulder and collar the compressing means for the follower is mounted, and I have shown such means as two crossed levers $c\ d$, their lower ends depending below the cross-bar and engaging the top of the follower. The length of the lever-arms $c'\ d'$ is such that when brought well together the follower will be brought as near as desirable to the bottom of the pan, the long ends of the levers above the bar serving as operating-handles. If the levers are moved from dotted to full line position, Fig. 1, it will be manifest that the follower will be depressed a distance determined by the angle between the levers. One of the levers, as $c$, has pivoted thereon at $c^2$ a locking device, shown as a rack-bar $f$, the teeth $f'$ on its lower edge being adapted to engage a pin or projection $d^3$ on the other lever. After the material to be placed is pressed in the receptacle $a$ the follower $a^\times$ is inserted, the cross-bar connected with the receptacle, as described, and the levers are closed until the desired pressure upon the material is attained, the locking-bar catching on the projection $d^3$ and holding the levers closed at the desired point. Then the press may be set aside as long as necessary, the pressure being maintained on the material for as long a period as desired. Afterward the cross-bar and compressing means are removed, the follower taken out, and the mold or material is removed by turning the receptacle upside down.

In Figs. 3 and 4 I have shown a different form of cross-bar and detachable connection with the receptacle. The cross-bar is made in two parts $g\ h$, each having an annular flange thereon, $g'\ h'$, respectively, and the flange $h'$ is provided with a threaded socket $h^2$ to receive the threaded end $g^2$ of the part $g^3$ of the member $g$ which projects beyond the flange $g'$. The compressing-levers are applied to the part $g^3$, and the two members $g$ and $h$ are then screwed together, the flanges maintaining the levers in position, as do the flange $b^2$ and collar $b^3$ in Fig. 2. The outer ends of the bar members are increased in width, as shown in Fig. 3, and downturned to form hooks $g^4\ h^4$, which embrace the ribs $a'$ of the side walls of the pan. To apply the cross-bar, the hooks are slipped onto the ribs at one end and the bar is slid into position about midway between the ends of the pan. When doing this, the levers must be spread apart into substantially horizontal position, and after the bar is in place the levers are then drawn up again into operative position.

In Figs. 3 and 4 I have shown the lower ends of the compressing-levers as provided with rolls, as $c^5\ d^5$, which are pivotally mounted in the levers and roll upon the top of the follower, so that if the latter is made of cast-iron the top need not be finished, the rolls traveling easily over the surface when the levers are drawn together to depress the follower.

Having described my invention, what I claim as new, and desire to secure by Letters Patent, is—

1. In a culinary press, a receptacle for the material to be pressed, a follower movable therein, a cross-bar detachably connected with the walls of the receptacle, crossed levers fulcrumed on the cross-bar, the lower ends of the levers engaging the top of the follower, closing of said levers acting to depress the follower, and a locking device mounted on one lever independently of the fulcrum thereof, to engage the other lever to hold the levers in adjusted position.

2. A culinary press comprising a pan to contain the material to be pressed, a removable follower to freely enter the pan, a cross-bar detachably mounted on the side walls of the pan, crossed levers fulcrumed on said bar and having their lower ends depending below it to engage the follower, and a rack-bar mounted on one lever above the fulcrum to engage a projection on the other lever, the levers when drawn together acting to depress the follower, the rack-bar and projection locking the levers in desired position.

3. In a culinary press, a receptacle for the material to be pressed, having longitudinal ribs at the tops of its side walls, a follower freely movable in the receptacle, a separable cross-bar having downturned hooks at its outer ends, to embrace the ribs on the side walls of the receptacle, a coupling device for the cross-bar members, means fulcrumed on the cross-bar to press the follower down upon the contents of the receptacle, and a locking device to act upon said means and to maintain the desired compression by the follower.

In testimony whereof I have signed my name to this specification in the presence of two subscribing witnesses.

ISAAC BRIGGS.

Witnesses:
GEORGE W. CASWELL,
GEORGE B. THOMAS.